United States Patent
Peercy et al.

(10) Patent No.: US 6,985,149 B2
(45) Date of Patent: Jan. 10, 2006

(54) SYSTEM AND METHOD FOR DECOUPLING THE USER INTERFACE AND APPLICATION WINDOW IN A GRAPHICS APPLICATION

(75) Inventors: Mark Peercy, Cupertino, CA (US); Alex Chalfin, Mountain View, CA (US); Alpana Kaulgud, Mountain View, CA (US)

(73) Assignee: Silicon Graphics, Inc., Mountain View, CA (US)

(*) Notice: Subject to any disclaimer, the term of this patent is extended or adjusted under 35 U.S.C. 154(b) by 433 days.

(21) Appl. No.: 10/208,049

(22) Filed: Jul. 31, 2002
(Under 37 CFR 1.47)

(65) Prior Publication Data
US 2004/0021659 A1    Feb. 5, 2004

(51) Int. Cl.
*G06T 1/20*    (2006.01)
(52) U.S. Cl. ........................ 345/506; 345/629
(58) Field of Classification Search ........... 345/629, 345/506
See application file for complete search history.

(56) References Cited

U.S. PATENT DOCUMENTS 6,680,739 B1 * 1/2004 Robertus et al. ............ 345/581
6,734,873 B1 * 5/2004 Herf et al. .................. 345/629

OTHER PUBLICATIONS

Richardson, T., and Wood, K.R., "The RFB Protocol," Real VNC Ltd, Formerly of Olivetti Research Ltd/AT&T Labs Cambridge, v. 3.3: pp. 1-34 (Jul. 2002).

* cited by examiner

*Primary Examiner*—Almis R. Jankus
*Assistant Examiner*—Jon Hadidi
(74) *Attorney, Agent, or Firm*—Sterne, Kessler, Goldstein & Fox PLLC (57) ABSTRACT

A system and method for generating a image, where the image comprises both a graphical user interface (GUI) and a subject graphics image. A first graphics pipeline renders the subject graphics image. A second graphics pipeline renders the GUI graphics data. A compositor then composites together the rendered subject graphics data that is produced by the first graphics pipeline, and the rendered GUI graphics data that is produced by the second graphics pipeline.

24 Claims, 11 Drawing Sheets

SYSTEM AND METHOD FOR DECOUPLING THE USER INTERFACE AND APPLICATION WINDOW IN A GRAPHICS APPLICATION

CROSS-REFERENCE TO RELATED APPLICATIONS

This application is related to pending U.S. application Ser. No. 09/888,438, filed Jun. 26, 2001, which claims priority to U.S. Provisional Application No. 60/219,006, filed Jul. 18, 2000. U.S. patent application Ser. Nos. 09/888,438 and 60/219,006 are both incorporated herein by reference in their entirety.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The invention described herein relates to computer graphics, and more particularly to rendering and integration of a graphical user interface.

2. Background Art

In a typical computer graphics application, a user would generally like to be presented with two components. First, the user wants to be shown the computer graphics image that is the subject of the application's processing. This image is known hereinafter as the subject graphics image. Second, the user may want to be shown a graphical user interface (GUI). The GUI can include, for example, window borders, a cursor whose position corresponds to the position of appointing device (such as a mouse, light pen, or joystick), and a set of controls. The controls can include icons that, if chosen by the user, activate one or more processing routines. Commonly, both the subject graphics image and the GUI are rendered using a single graphics pipeline. Either the subject graphics or a GUI could be displayed at any time, but not both.

Moreover, in some systems, two rendering pipelines are used, one for the GUI and one for the subject graphics image. But such systems still do not show both the subject graphics image and the GUI to the user at the same time on a single display. Again, one or the other is shown at any given time. Clearly, for most graphics applications, the user would prefer to see both simultaneously.

Hence, there is a need for a computer graphics architecture in which a subject graphics image and a user interface are both are displayed to a user simultaneously.

BRIEF SUMMARY OF THE INVENTION

The invention described herein is a system and method for generating an image, where the image comprises both a GUI and a subject graphics image. A first graphics pipeline renders the subject graphics image. A second graphics pipeline renders the GUI graphics data. In an embodiment of the invention, the subject graphics data and the GUI graphics data originate from a single graphics application program executing on a graphics host, and are therefore decoupled for purposes of rendering. The invention then composites the rendered subject graphics data that is produced by the first graphics pipeline, along with the rendered GUI graphics data that is produced by the second graphics pipeline. The composite image is then displayed to the user.

The foregoing and other features and advantages of the invention will be apparent from the following, more particular description of a preferred embodiment of the invention, as illustrated in the accompanying drawings.

DETAILED DESCRIPTION OF THE INVENTION

I. Overview

The invention described herein is a system and method for generating a image, where the image comprises both a GUI and a subject graphics image. In an embodiment of the invention, subject graphics data (corresponding to the subject graphics image) and GUI graphics data (corresponding to the GUI graphics image) originate from a single graphics application program executing on a graphics host, and are decoupled for purposes of rendering. The system includes a first graphics pipeline for rendering the subject graphics image, which can be thought of as the contents of a window in the graphics application. This yields rendered subject graphics data. The invention also includes a second graphics pipeline for rendering the GUI graphics. This yields rendered GUI graphics data. Third, the invention includes a compositor for compositing the rendered subject graphics data produced by the first graphics pipeline, and the rendered GUI graphics data produced by the second graphics pipeline.

II. System

Figure 1:
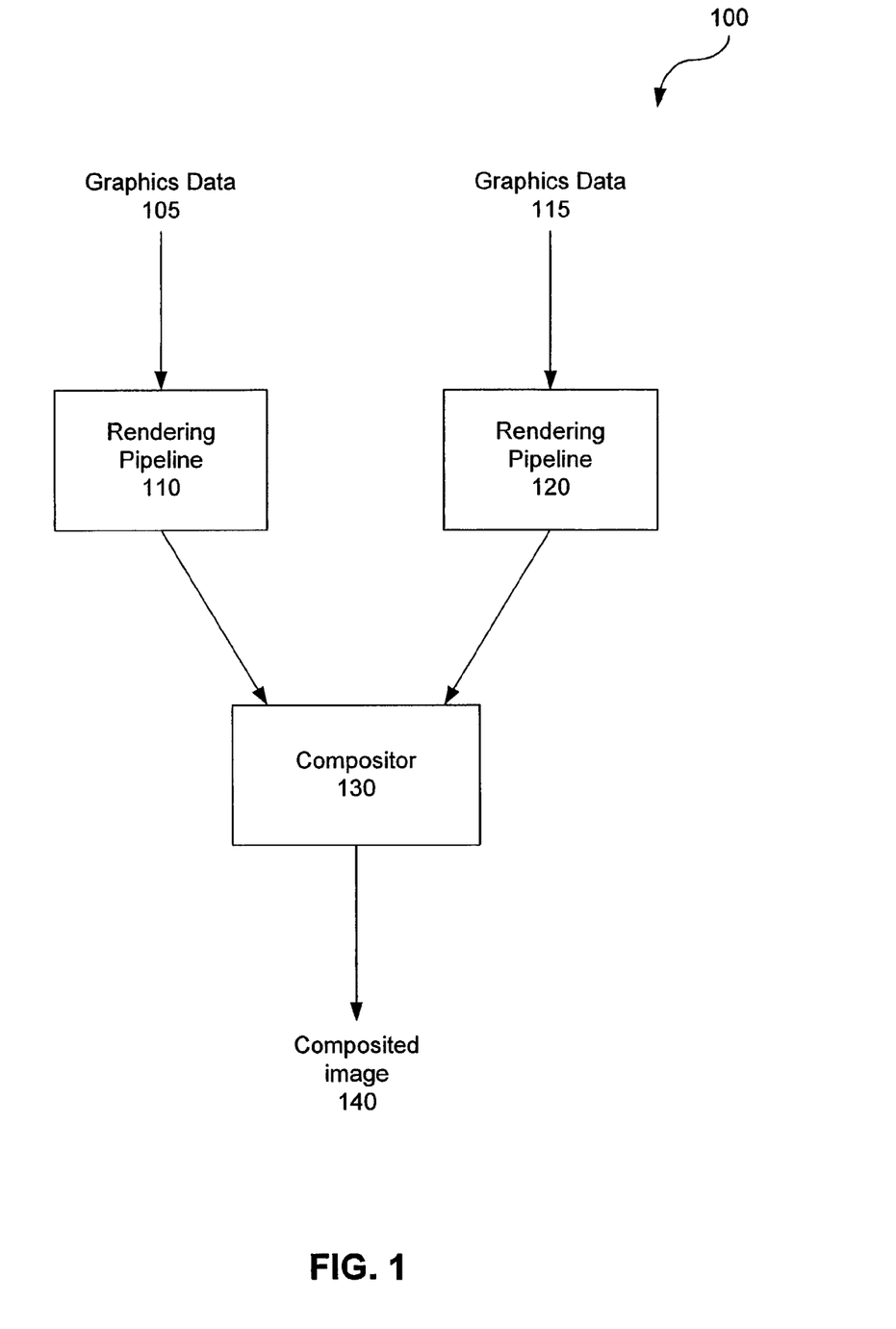
FIG. 1 is a block diagram illustrating a graphics system that includes two rendering pipelines whose outputs are composite to produce a final image.

The system of the present invention includes two rendering pipelines, each of which accepts graphics data as an input. The rendered graphics data output by each rendering pipeline is then sent to a compositor, which combines the rendered graphics data to produce a single composite image. This is illustrated in FIG. 1. Graphics data 105 is shown as an input to a rendering pipeline 110. Also, graphics data 115 is shown as an input to a rendering pipeline 120. The outputs of the two rendering pipelines are then sent to a compositor 130. Compositor 130 combines the two components, the rendered graphics data from pipelines 110 and 120, to produce a composite image 140.

Figure 2:
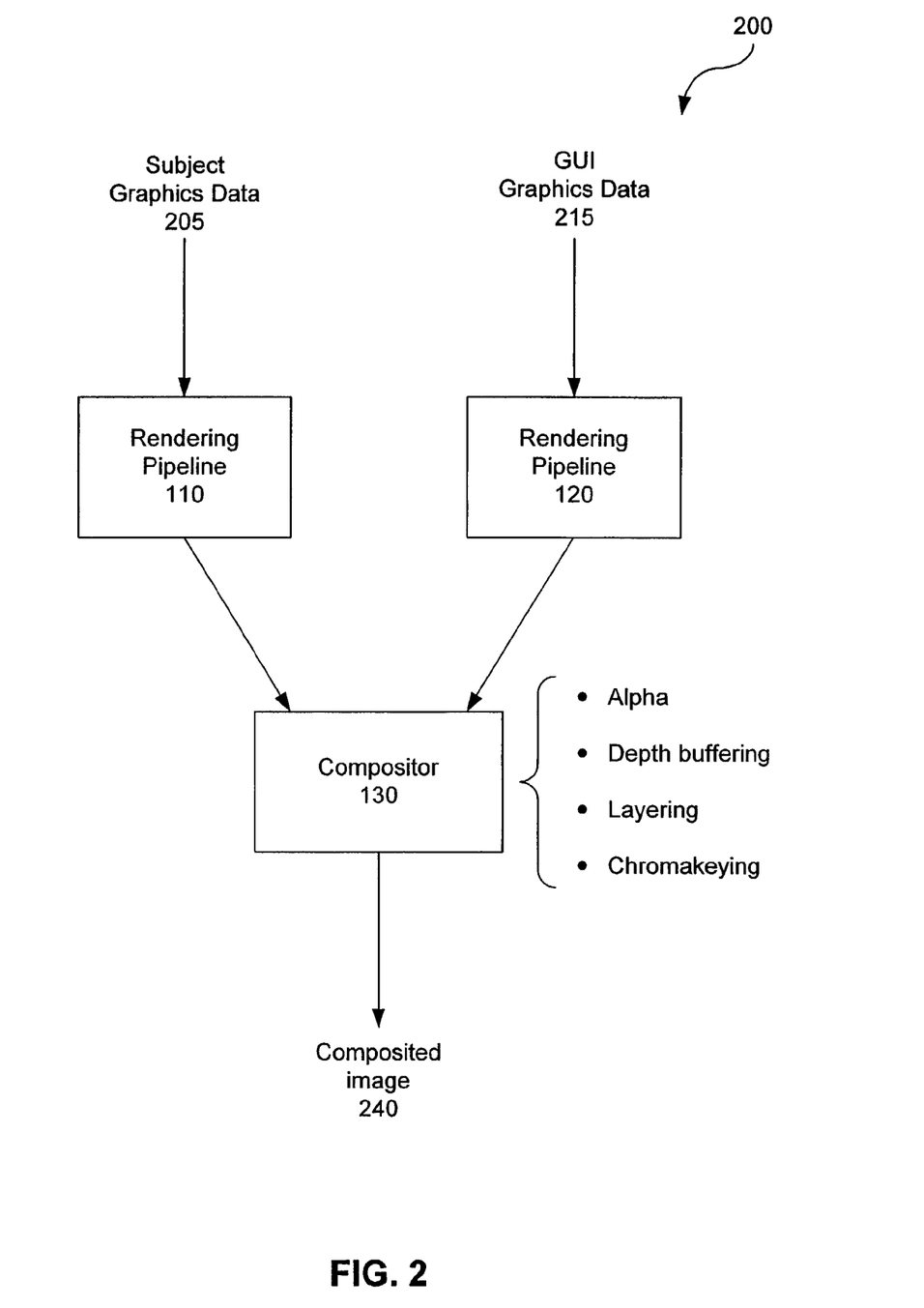
FIG. 2 is a block diagram illustrating a graphics system that features two rendering pipelines, one for subject graphics data, and the other for GUI graphics data, according to an embodiment of the invention.

In this invention, the graphics data that is input to the rendering pipelines is of two varieties. First, the subject graphics data must be rendered; in addition, the GUI graphics data must be rendered. This is shown in FIG. 2. Graphics data representing the subject image to be rendered is shown as subject graphics data 205. Subject graphics data 205 is input to rendering pipeline 110. Meanwhile, rendering pipeline 120 receives, as its input, GUI graphics data 215. In an embodiment of the invention, both subject graphics data 205 and GUI graphics data come from a single graphics host on which a graphics application is executing. The outputs of rendering pipelines 110 and 120 are combined in compositor 130. The result is a composite image 240 formed from these components.

Note that compositor 130 can comprise logic for performing compositing according to a variety of algorithms. Compositing can be performed on the basis of alpha values of rendered pixels, for example. In such a process, the final composite pixel has color coordinates that represent linear combinations of coordinates of the contributing pixels. The exact linear combination of the pixels is dependent on the alpha values of the contributing pixels. In an embodiment of the invention, the alpha value of a GUI pixel is 0 where the subject image should be, and 1 where the GUI should be.

Alternatively, the compositing process can be performed using depth buffering. Here, each component pixel is mapped to an image layer. Compositing is then performed on the resulting layers. A special case of depth buffering is layering, a process in which rendered subject graphics data is assigned to one image layer, while rendered GUI graphics data is assigned to another layer. Compositing is then performed on the two layers to derive a composite image. Alternatively, the compositing process can apply a chromakeying approach wherein the "blank space" of a given rendered image is filled in, wherever it occurs, by the rendered graphics data of the other component image, thereby producing a composite image. Moreover, a compositor can be implemented in hardware, software, or firmware, or using some combination of these.

In general, rendering can also be implemented using hardware, software, or firmware, or some combination thereof. A rendering pipeline according to an embodiment of the invention is illustrated generally in FIG. 3, as rendering pipeline 300. Rendering pipeline 300 is illustrative and not intended to limit the scope of the present invention. Other types of rendering pipelines can be used as would be apparent to a person skilled in the art, given this description. Therefore, while rendering pipelines 110 and 120 can have the structure shown in FIG. 3, other embodiments of rendering pipelines can be used. Moreover, rendering pipelines 110 and 120 need not be identical.

Figure 3:
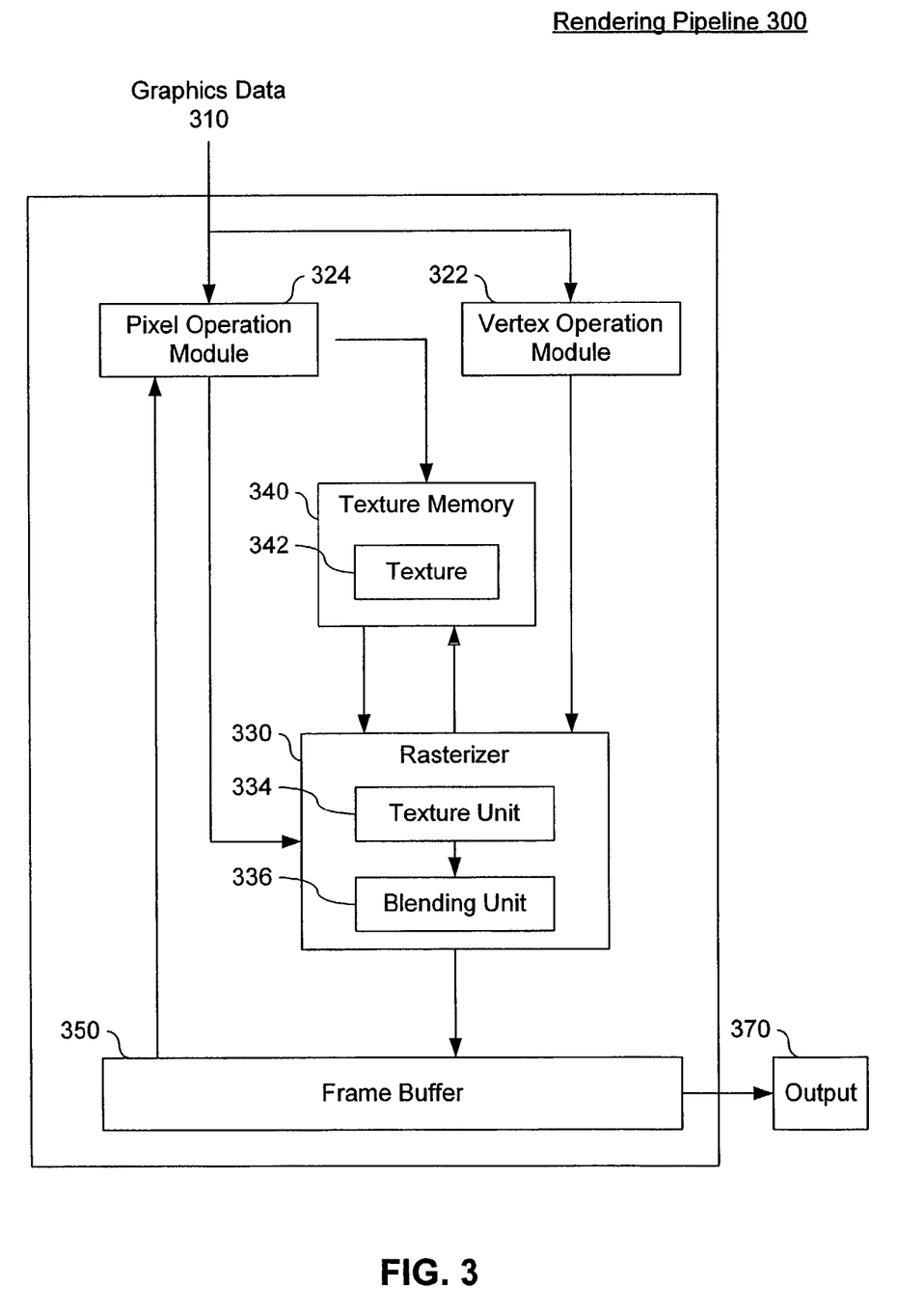
FIG. 3 is a detailed block diagram of an example graphics rendering pipeline.

Rendering pipeline 300 comprises a vertex operation module 322, a pixel operation module 324, a rasterizer 330, a texture memory 340, and a frame buffer 350. Rendering pipeline receives graphics data 310, which is initially routed to vertex operation module 322 and a pixel operation module 324. Texture memory 340 can store one or more textures or images, such as texture 342. Texture memory 340 is connected to a texture unit 334 by a bus (not shown). Rasterizer 330 comprises texture unit 334 and a blending unit 336. Texture unit 334 and blending unit 336 can be implemented separately or together as part of a graphics processor. The operation of these features of rendering pipeline 300 would be known to a person skilled in the relevant art given the description herein.

In embodiments of the present invention, texture unit 334 can obtain either a point sample or a filtered texture sample from textures and/or images stored in texture memory 340. Blending unit 336 blends texels and/or pixel values according to weighting values to produce a single texel or pixel. The output of texture unit 338 and/or blending unit 336 is stored in frame buffer 350. The contents of frame buffer 350 can then be read out as output 370.

The embodiment shown in FIG. 3 can operate as a multipass graphics pipeline. It is capable of operating on each pixel of an image during each pass that the image makes through the graphics pipeline.

In alternative embodiments of the invention, more than two graphics pipelines can be employed. One or more can be dedicated to rendering of subject image data; likewise, one or more can be dedicated to rendering GUI graphics data.

III. Method

The method of the invention features separate rendering processes for the subject graphics data and for GUI graphics data, respectively. Rendered data from the two processes is then combined in a compositing process.

Figure 4:
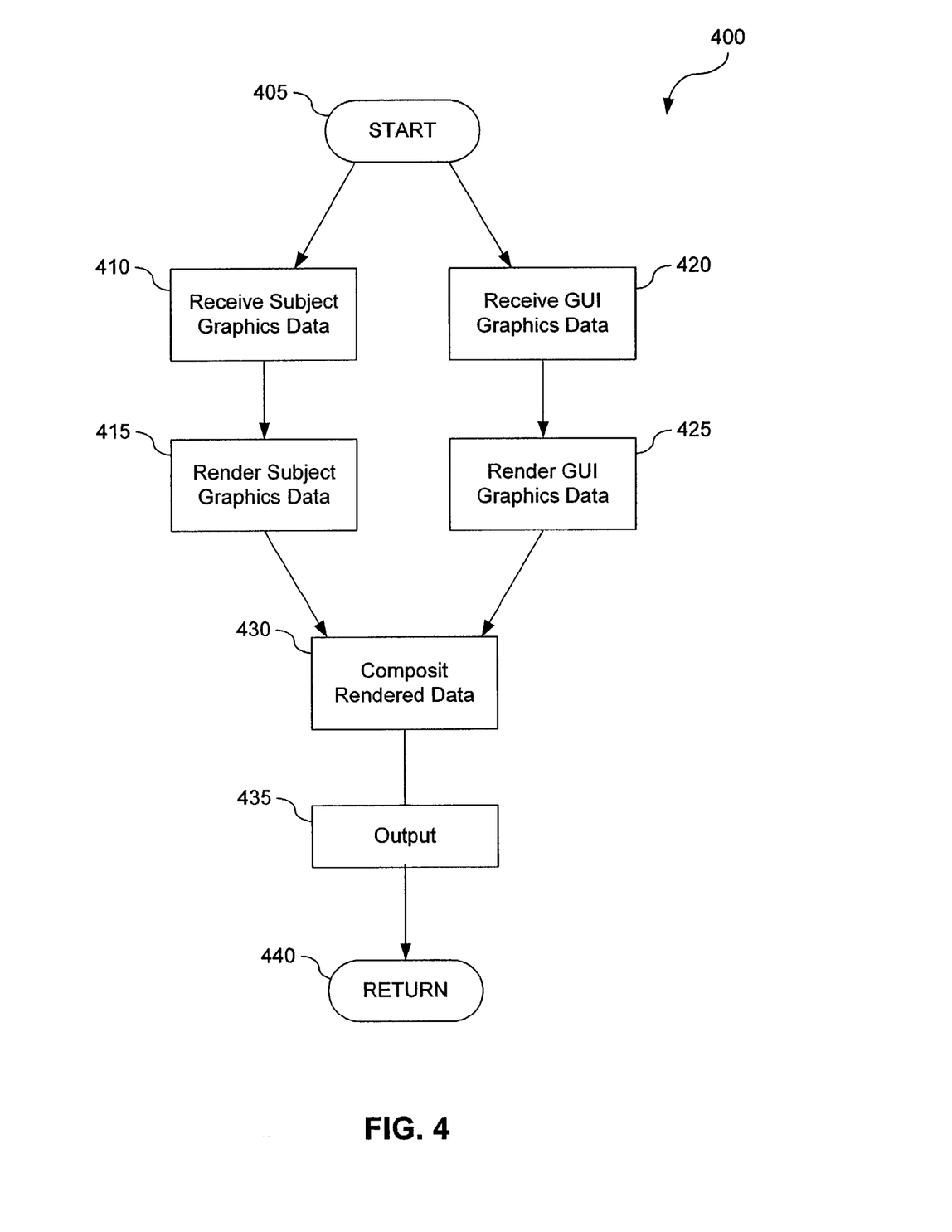
FIG. 4 is a flowchart illustrating the overall method of an embodiment of the invention.

The method is illustrated generally in FIG. 4, and begins at step 405. In step 410, graphics data corresponding to the subject image is received. In step 415, this graphics data is then rendered. Meanwhile, GUI graphics data is received in step 420, and rendered in step 425. As described above, the subject graphics data and the GUI graphics data can originate from a single graphics application executing on a graphics host. The rendered subject graphics data and the rendered GUI graphics data are then combined in compositing step 430. In step 435, the composition of these two components, the composite image, is output for display or storage. The process concludes at step 440.

Figure 5:
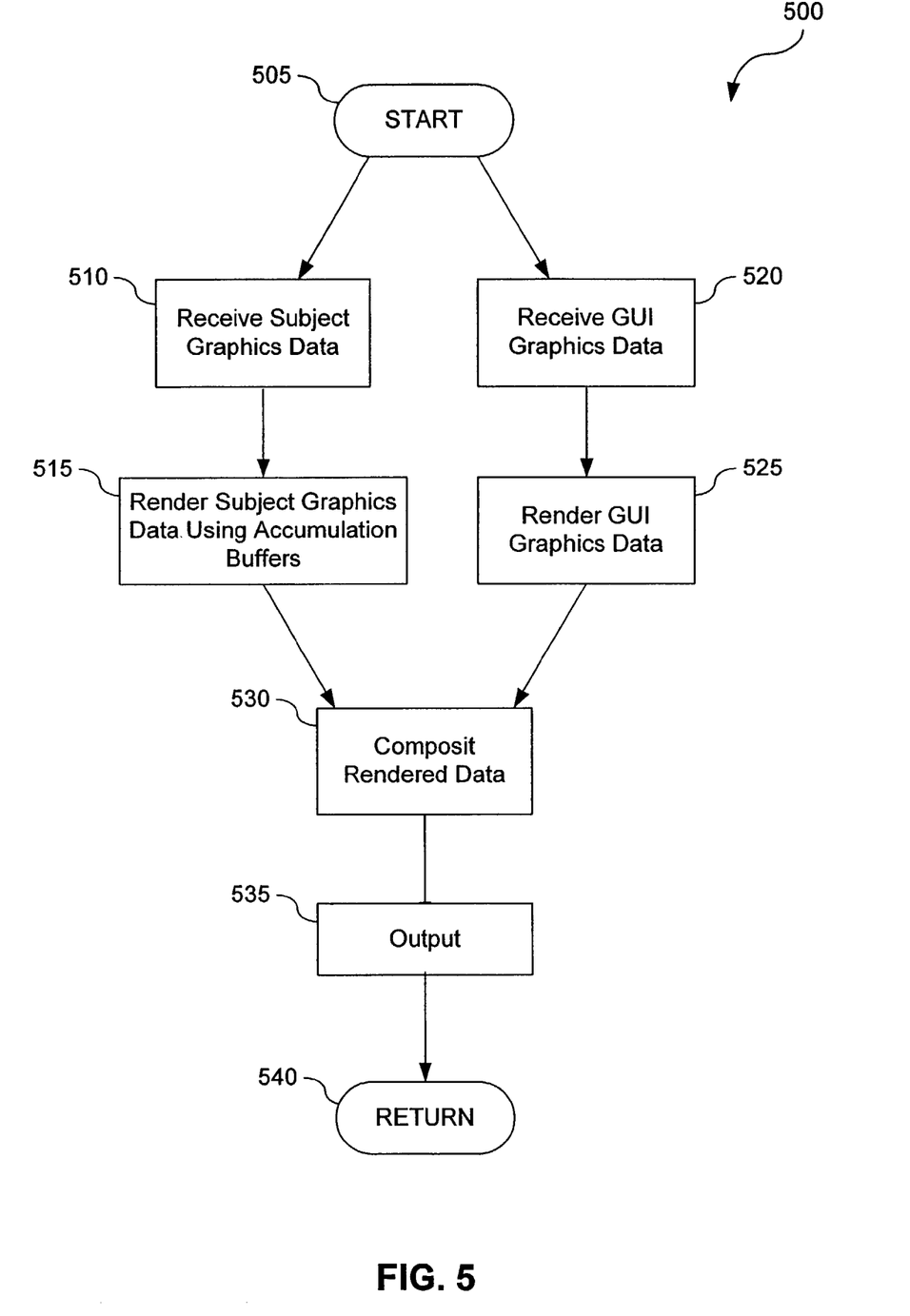
FIG. 5 is a flowchart illustrating an embodiment of the method of the invention, wherein subject graphics data is rendered using accumulation buffers.
Figure 6:
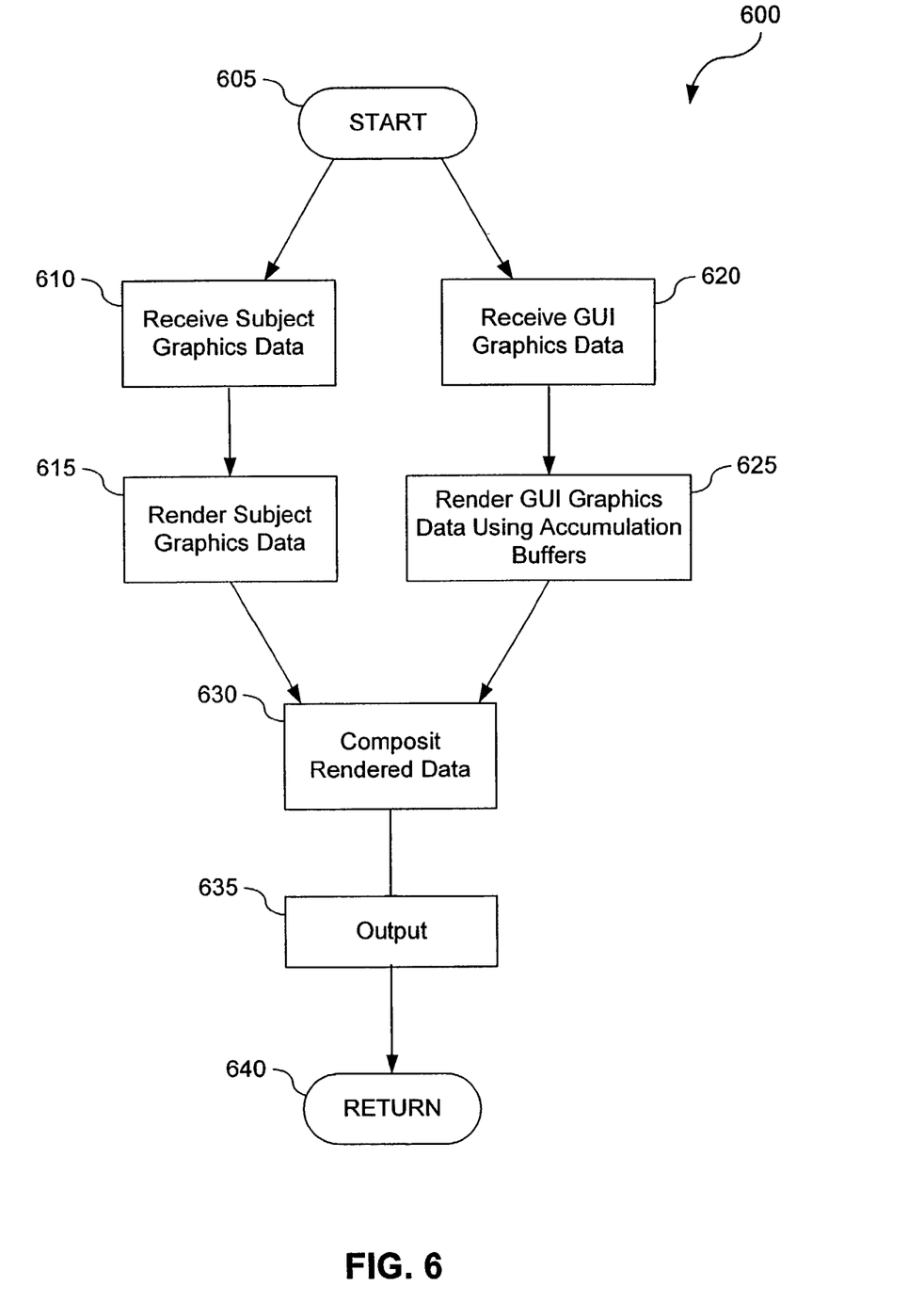
FIG. 6 is a flowchart illustrating an embodiment of the method of the invention, wherein the GUI is rendered using accumulation buffers.

Note that in different embodiments of the invention, rendering can be performed in different ways. FIG. 5, for example, illustrates an embodiment of the invention similar to that of FIG. 4 except that the rendering of the subject graphics data is performed in step 515 using accumulation buffers. In such a rendering process, color coordinates for a pixel are summed as the rendering proceeds iteratively. Likewise, FIG. 6 illustrates an embodiment of the invention similar to that of FIG. 4, except that the rendering of the GUI graphics data is performed using accumulation buffers in step 625. In an alternative embodiment, accumulation buffers are used in rendering both the GUI and the subject graphics image.

Figure 7:
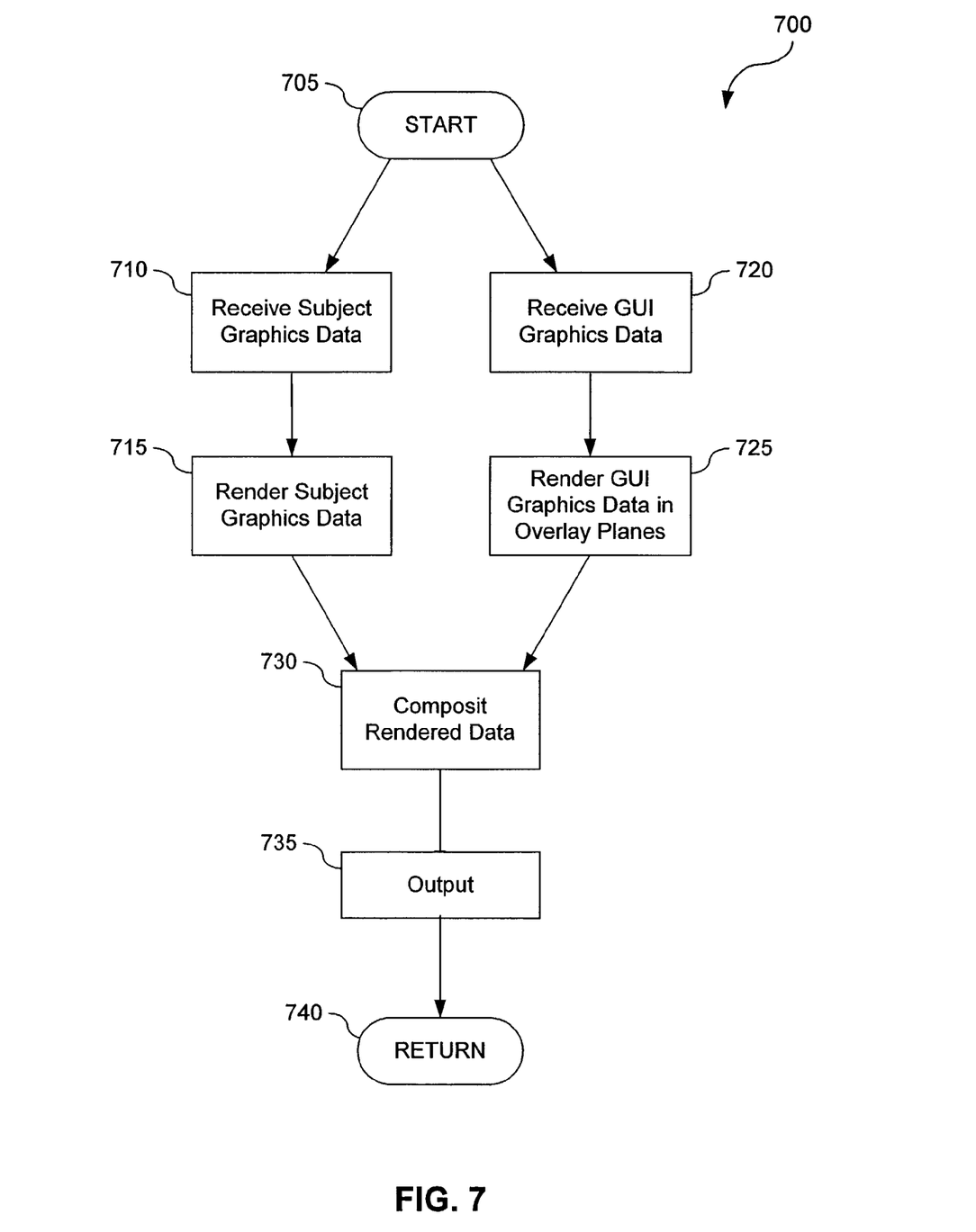
FIG. 7 is a flowchart illustrating an embodiment of the method of the invention, wherein GUI graphics are rendered using overlay planes.

FIG. 7 illustrates an embodiment of the invention, again, similar to that of FIG. 4, except that the GUI graphics data is rendered using overlay planes in step 725. This permits an annotative style of graphics where, for example, the outline of a window is shown as the window is moved by a user.

Figure 8:
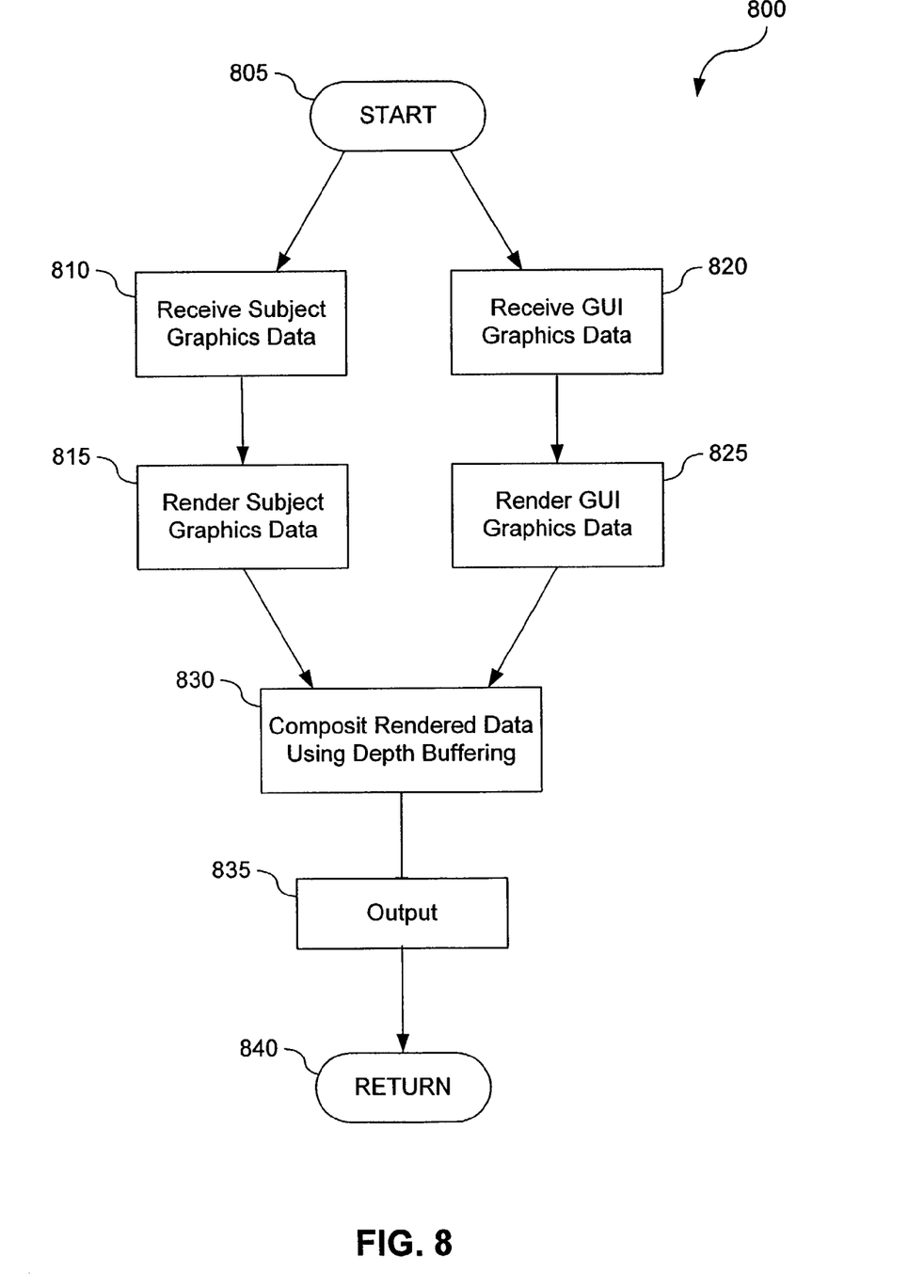
FIG. 8 is a flowchart illustrating an embodiment of the method of the invention, wherein compositing is performed using depth buffering.
Figure 9:
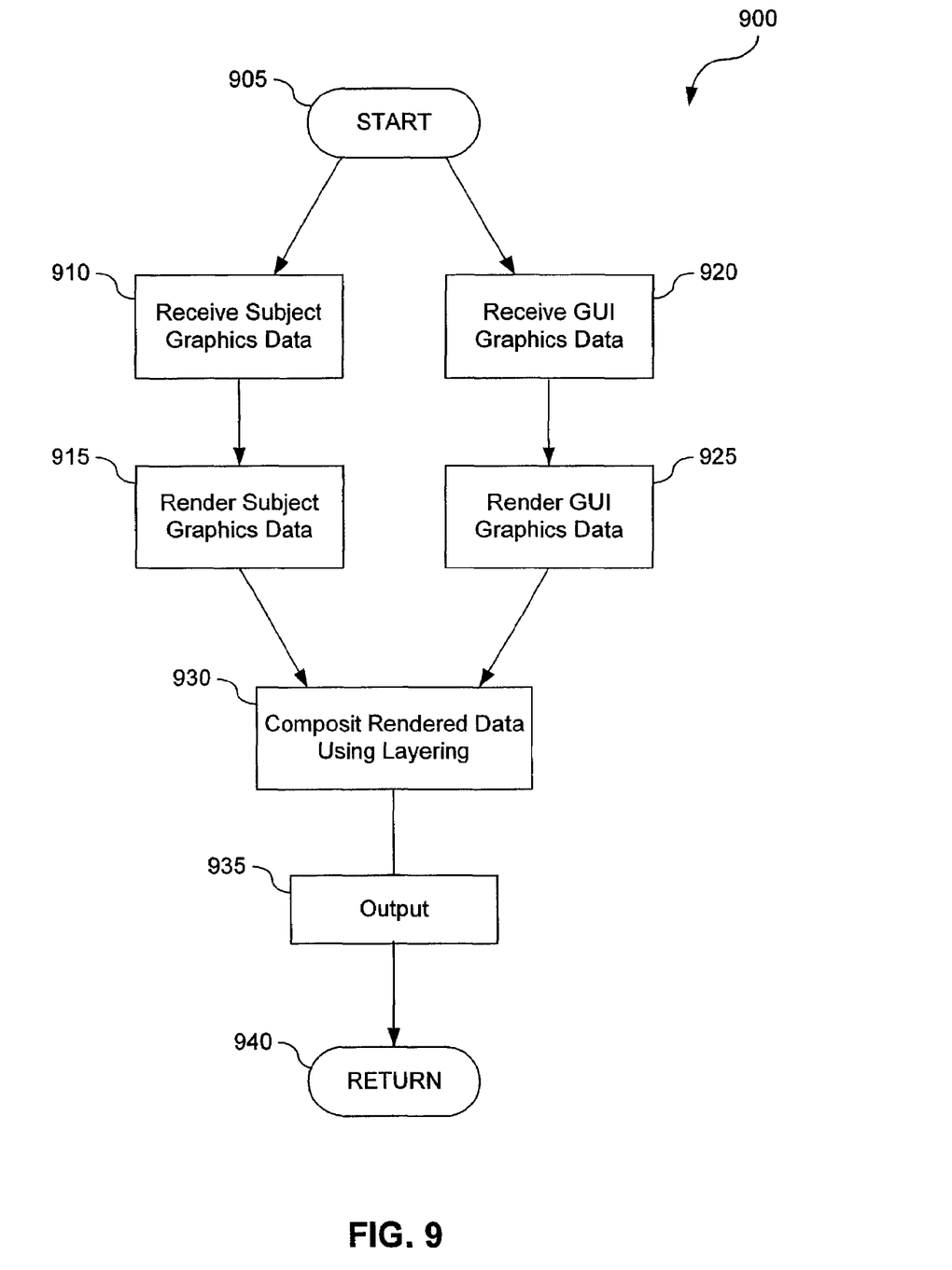
FIG. 9 is a flowchart illustrating an embodiment of the method of the invention, wherein compositing is performed using layering.

As discussed earlier with respect to the system of the invention, the compositing process can take place using a variety of algorithms. FIG. 8, for example, illustrates an embodiment of the invention, wherein compositing is performed using depth buffering in step 830. Here, as described above, each component pixel is mapped to an image layer. Compositing is then performed on the resulting layers. A special case of depth buffering is layering, a process in which rendered subject graphics data is assigned to one image layer, while rendered GUI graphics data is assigned to another layer. Compositing is then performed on the two layers to derive a composite image. This is-illustrated in FIG. 9, where compositing of the rendered subject graphics data and the rendered GUI graphics data is performed using a layering process in step 930.

Figure 10:
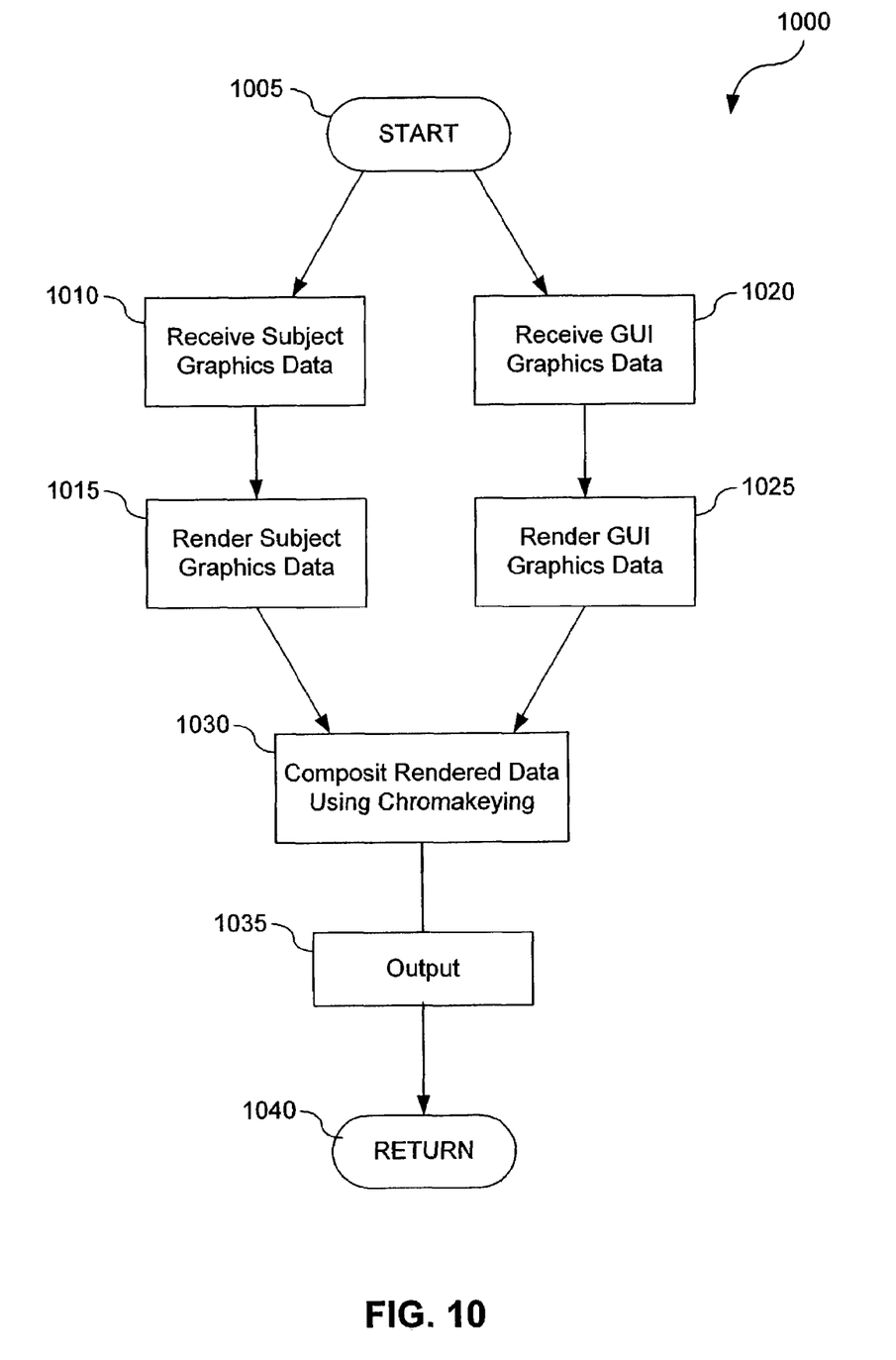
FIG. 10 is a flowchart illustrating an embodiment of the method of the invention, wherein compositing is performed using chromakeying.

In FIG. 10, compositing is performed using a chromakeying process in step 1030. As described above, the "blank space" of a given rendered image is filled in, wherever it occurs, by the rendered graphics data of the other component image, thereby producing a composite image.

Figure 11:
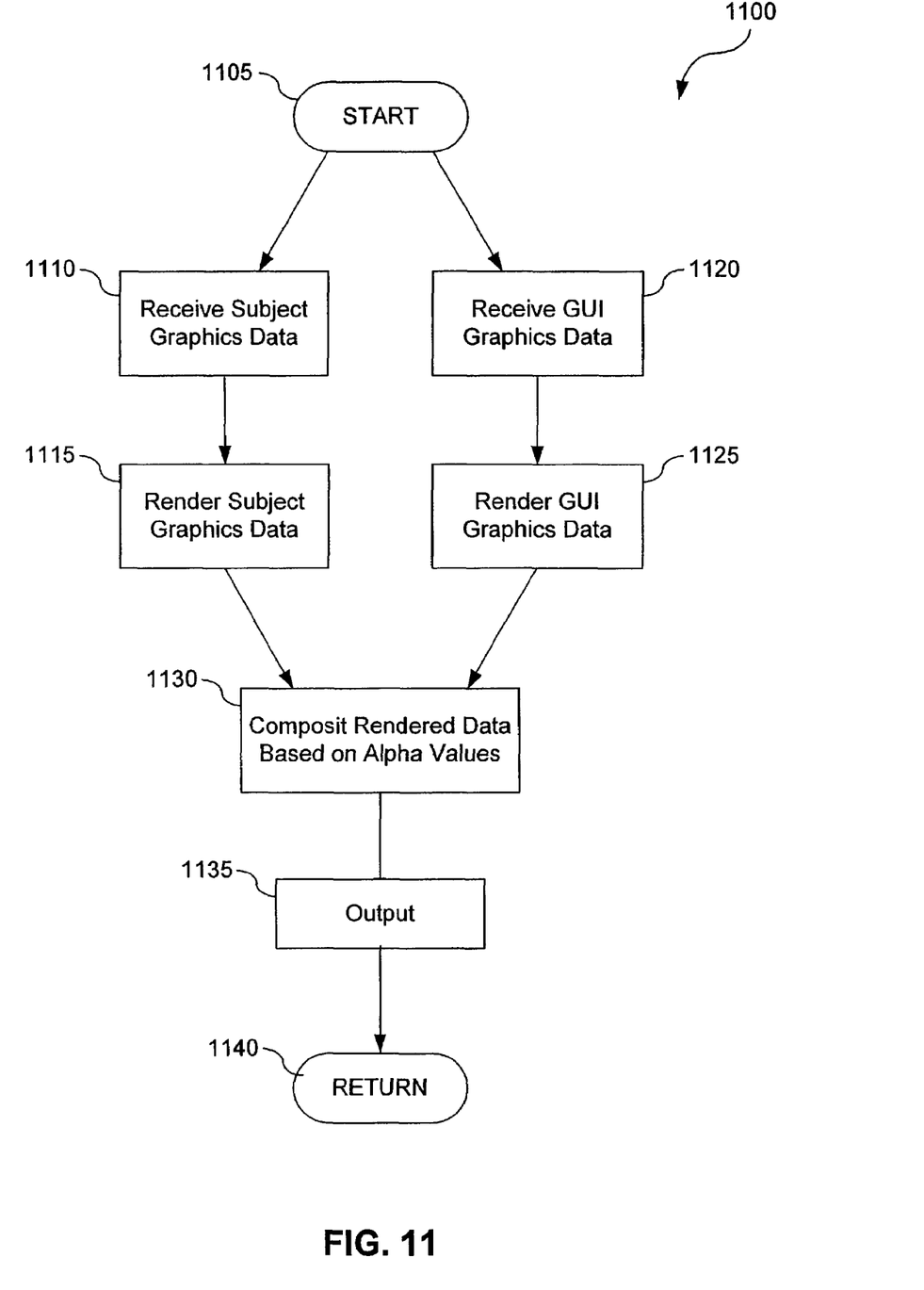
FIG. 11 is a flowchart illustrating an embodiment of the method of the invention, wherein compositing is performed on the basis of alpha values.

Finally, in FIG. 11, the process of the invention is shown wherein the compositing process is performed in step 1130 based on alpha values. In such a process, the final composite pixel has color coordinates that represent linear combinations of coordinates of the contributing pixels. The exact linear combination of the pixels is dependent on the alpha values of the contributing pixels. In an embodiment of the invention, the alpha value of a GUI pixel is 0 where the subject image should be, and 1 where the GUI should be.

Each of methods 400 through 1100 can be implemented in software, firmware, hardware, or a combination thereof. For example, compositors with control logic implemented in software, firmware, hardware, or a combination thereof can be used to carry out the compositing step in each of the above methods. Likewise, rendering can be performed using control logic implemented in software, firmware, hardware, or a combination thereof.

CONCLUSION

While the various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above described exemplary embodiments, but should be defined only in accordance with the following claims and their equivalents.

What is claimed is:

1. A system for generating an image, wherein the image comprises a user interface component and a subject graphics component, comprising:
   a first graphics pipeline for rendering subject graphics data;
   a second graphics pipeline for rendering graphical user interface (GUI) graphics data; and
   a compositor for compositing
      rendered subject graphics data that is output from said first graphics pipeline, and
      rendered GUI graphics data that is output from said second graphics pipeline;
   and wherein said first pipeline receives and renders only subject graphics data of the image, and said second graphics pipeline receives and renders only GUI graphics data of the image.

2. The system of claim 1, wherein said compositor comprises logic for compositing based on alpha values of said rendered subject graphics data and of said rendered GUI data.

3. The system of claim 1, wherein said compositor comprises logic for compositing using a chromakeying process.

4. The system of claim 1, wherein said compositor comprises logic for compositing using a depth buffering process.

5. The system of claim 4, wherein said logic for compositing using a depth buffering process comprises logic for a layering process.

6. The system of claim 1, wherein said second graphics pipeline renders GUI graphics data in the form of an overlay plane.

7. The system of claim 1, wherein said second graphics pipeline comprises an accumulation buffer.

8. The system of claim 1, wherein said first graphics pipeline comprises an accumulation buffer.

9. A method of generating an image that comprises a user interface component and a subject graphics component, the method comprising the steps of:
   a) receiving only subject graphics data of the image in a first graphics pipeline;
   b) rendering the subject graphics data of the image in the first graphics pipeline;
   c) receiving only graphical user interface (GUI) graphics data of the image in a second a graphics pipeline;
   d) rendering the GUI graphics data of the image in the second graphics pipeline; and
   e) compositing the rendered subject graphics data and the rendered GUI graphics data.

10. The method of claim 9, wherein said step e) comprises compositing the rendered subject graphics data and the rendered GUI graphics data on the basis of alpha values of the rendered graphics data.

11. The method of claim 9, wherein said step e) comprises compositing the rendered graphics data using chromakeying.

12. The method of claim 9, wherein said step e) comprises compositing the rendered graphics data using depth buffering.

13. The method of claim 9, wherein said step e) comprises layering of the rendered subject graphics data and the rendered GUI graphics data.

14. The method of claim 9, wherein said step d) comprises rendering the GUI data in the form of an overlay plane.

15. The method of claim 9, wherein said step d) comprises rendering the GUI data using an accumulation buffer.

16. The method of claim 9, where said step b) comprises rendering the subject graphics data using an accumulation buffer.

17. A system for generating an image that comprises a user interface component and a subject graphics component, the system comprising:
   a) logic for receiving only subject graphics data of the image in a first graphics pipeline;
   b) logic for rendering only the subject graphics data of the image in the first graphics pipeline;
   c) logic for receiving only graphical user interface (GUI) graphics data of the image in a second a graphics pipeline;

d) logic for rendering only the GUI graphics data of the image in the second graphics pipeline; and e) logic for compositing the rendered subject graphics data and the rendered GUI graphics data.

18. The system of claim 17, wherein said compositing logic comprises logic for compositing the rendered subject graphics data and the rendered GUI graphics data on the basis of alpha values of the rendered graphics data.

19. The system of claim 17, wherein said compositing logic comprises logic for compositing the rendered graphics data using chromakeying.

20. The system of claim 17, wherein said compositing logic comprises logic for compositing the rendered graphics data using depth buffering.

21. The system of claim 17, wherein said compositing logic comprises logic for layering of the rendered subject graphics data and the rendered GUI graphics data.

22. The system of claim 17, wherein said logic for rendering the GUI graphics data comprises logic for rendering the GUI data in the form of an overlay plane.

23. The system of claim 17, wherein said logic for rendering the GUI graphics data also uses an accumulation buffer.

24. The system of claim 17, where said logic for rendering the subject graphics data also uses an accumulation buffer.

* * * * *